Patented Sept. 4, 1934

1,972,184

UNITED STATES PATENT OFFICE 1,972,184

TREATMENT OF COFFEE-BEANS BY STEAM

Eduard Adolf Closmann, Fritz Artur Vorsatz, and Karl Alfred Kasper, Leipzig, Germany, assignors to Commerzinag Aktiengesellschaft, Glarus, Switzerland No Drawing. Application November 19, 1932, Serial No. 643,524. In Germany November 25, 1931

3 Claims. (Cl. 99—11)

The object of the invention is a process for the treatment of coffee-beans by steam for the purpose of improving the flavour. To treat raw coffee-beans steam, possibly with the addition of certain chemical agents, for example ozone in order to remove out of the bean certain substances prejudicial to the flavour, is well known. However, it appears, that raw coffee-beans treated in this manner render more difficult the accomplishment of the roasting process, in so far as the roasting process of the coffee-beans treated by steam is not a uniform one. In order to get a uniform appearance, it is necessary to roast the bean in a strong manner, so that it gets a darker colour. Even with that extended accomplishment of the roasting process it is not possible to roast all beans quite uniformly dark, but the beans differ in their appearance and the single beans—apart from the differences with one another—show even darker places, spots, etc., indicating that the roasting process through the beans has not progressed in a uniform manner. Added to this, that—when a so-called unwashed coffee is subjected to the pre-treatment by steam and chemical agents in order to improve the flavour—the membranes adhering to the beans stick fast to them and then can only be perfectly removed with difficulty before the roasting process takes place.

According to the invention, all these disadvantages appearing in the roasting of raw coffee-beans, treated by steam, are avoided and an accomplishment of the roasting-process up to every degree of colouring of the beans after the treatment by steam is possible, in a uniform manner if the coffee beans—before the treatment by steam takes place—are submitted to a pre-roasting process which essentially consists in the fact that the natural moisture contained in the raw beans is distilled off. According to experience and corresponding to the quality of the coffee bean, a duration of about 20 to 50 per cent of the time usually necessary for a normal roasting process suffices for the pre-roasting. It is possible to finish the roasting of such a coffee, pre-roasted in such a manner, and submitted after this to the treatment by steam in order to improve its flavor, in a uniform way. In each phase of this finishing process, the coffee beans show among themselves the same degree of colouring and the same state of roasting, and the single coffee bean is uniformly coloured in each phase of the roasting process.

The pre-treatment of the raw coffee-beans by a pre-roasting process has therefore a double technical effect: first consisting in the fact that the usual unequal colouring of the coffee beans (formation of spots and dark places), appearing during the roasting of coffee beans treated by steam, is avoided; and, on the other hand, the advantage, that it is not necessary to carry out the roasting process—as hitherto—up to the highest possible dark-colouring of the bean, but that the roasting process can be interrupted as desired even at a lower degree of roasting shown by the lighter colouring of the bean.

As a further progress must also be stated, that by this process at the same time an improvement of flavour of the coffee corresponding to the more uniform roasting is obtained in comparison with the coffee beans roasted in an unequal manner by the old well-known process.

Suitably, the pre-roasting can be accomplished in the usual roasting drums and according to the well-known roasting process by a direct heating of the roasting drum up to the desired degree.

Further technical advantages besides those already described are obtained when the treatment by steam carried out after the pre-roasting, is effected in a special way as a steam-distillation i. e., in such a way that the steam acting on the coffee is continually distilled off so that the pre-roasted coffee-beans come only into contact with steam and not with water. After the steam-distillation the roasting process of the coffee is completed. As known, the roasted coffee contains certain substances which are not necessary for its aroma but act as a deleterious effect on the human organism. Such substances are: furan-derivatives (furfur-alcohol, furfurin, etc.) phenole, organic amines and pyridin-derivates, as well as organic acids, for instance valerianic acid.

As known, the really fine aroma of the coffee is formed in the final stage of the roasting process, while the above mentioned substances are formed considerably earlier by decomposition of pentosanes, albumens and tannic acid. By means, that the coffee beans submitted to the pre-roasting process, are subjected to a steam-distillation following upon this pre-roasting, one attains that the above mentioned flavour-destroying and injurious substances which otherwise are not removed out of the beans, and which are formed already during the pre-roasting process, are completely driven out by the steam-distillation, while the valuable oils produced during the very last stage of roasting (therefore during the finishing of the roasting) are fully preserved. The steam-distillation (between pre-roasting and finishing of the roasting) can also be carried out under the simultaneous action and influence of other suitable agents, for instance oxydizing agents and also acids, for example acetic acid.

The coffee treated according to the process differs in its finished roasted state from the usually roasted coffee by its purer and more agreeable aroma and flavour caused by the removal of the flavour-destroying substances, which are not quite or only imperfectly removable by the usual roasting process.

Further advantages of the coffee treated according to the invention are its extraordinary long keeping qualities and the removal of the sweating mostly occurring in the usually roasted coffee. If the coffee were submitted to a steam-distillation without pre-roasting, it would firstly have an unsightly appearance after the finished roasting, and secondly, by this direct steam-distillation, such flavour-destroying substances which are formed at only certain roasting temperatures during the roasting process, could not be removed.

I claim:

1. A process for improving the flavor of coffee by roasting with the aid of steam, comprising first partly roasting coffee beans for a duration of about 20% to 50% of the time needed for complete normal roasting, second, submitting the thus pre-roasted beans to the action of fresh steam while continually distilling off the used steam thereby decomposing and removing flavor destroying and injurious substances from the beans while retaining the valuable oils and lastly completing the roasting process until the beans show a uniform dark coloring.

2. A process for improving the flavor of coffee as described in claim 1 in which the beams are submitted simultaneously with the steam treatment, to the action of acetic acid.

3. A process for improving the flavor of coffee as described in claim 1 in which the beans are submitted simultaneously with the steam treatment, to the action of an oxidizing agent.

EDUARD ADOLF CLOSMANN.
FRITZ ARTUR VORSATZ.
KARL ALFRED KASPER.